(12) United States Patent
Itoh

(10) Patent No.: US 8,675,245 B2
(45) Date of Patent: Mar. 18, 2014

(54) APPARATUS WITH CAPABILITY OF DETECTING TWO-DIMENSIONAL CODE

(75) Inventor: Jun Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 13/398,340

(22) Filed: Feb. 16, 2012

(65) Prior Publication Data

US 2012/0229873 A1 Sep. 13, 2012

(30) Foreign Application Priority Data

Mar. 8, 2011 (JP) .................. 2011-050520

(51) Int. Cl.
- *G06K 15/02* (2006.01)
- *G06K 15/00* (2006.01)
- *H04N 1/40* (2006.01)

(52) U.S. Cl.
USPC ..................... 358/1.2; 358/1.18; 358/3.28

(58) Field of Classification Search
USPC ............. 358/449, 1.2, 1.18, 3.28; 382/181
See application file for complete search history.

(56) References Cited

U.S. PATENT DOCUMENTS

| 8,390,876 B2 * | 3/2013 | Hirao et al. | 358/1.2 |
| 2007/0003340 A1 * | 1/2007 | Yoshino | 399/366 |

FOREIGN PATENT DOCUMENTS

| JP | 2008-263283 | 10/2008 |
| JP | 2010-175540 | 8/2010 |

* cited by examiner

*Primary Examiner* — Charlotte M Baker

(74) *Attorney, Agent, or Firm* — Carter, DeLuca, Farrell & Schmidt LLP

(57) ABSTRACT

Since, for detecting a two-dimension code added to a document, the detection processing is performed by checking the four corners of the read image, if the user specifies an A3 size as a reading size of an image in the copy of an A4-size document, the two-dimensional code is not detected. When the document size detected by the copying machine differs from the reading size of the image specified by the user, the processing for the two-dimensional code detection is performed checking the four corners of the region of the document size detected by the copying machine.

7 Claims, 14 Drawing Sheets

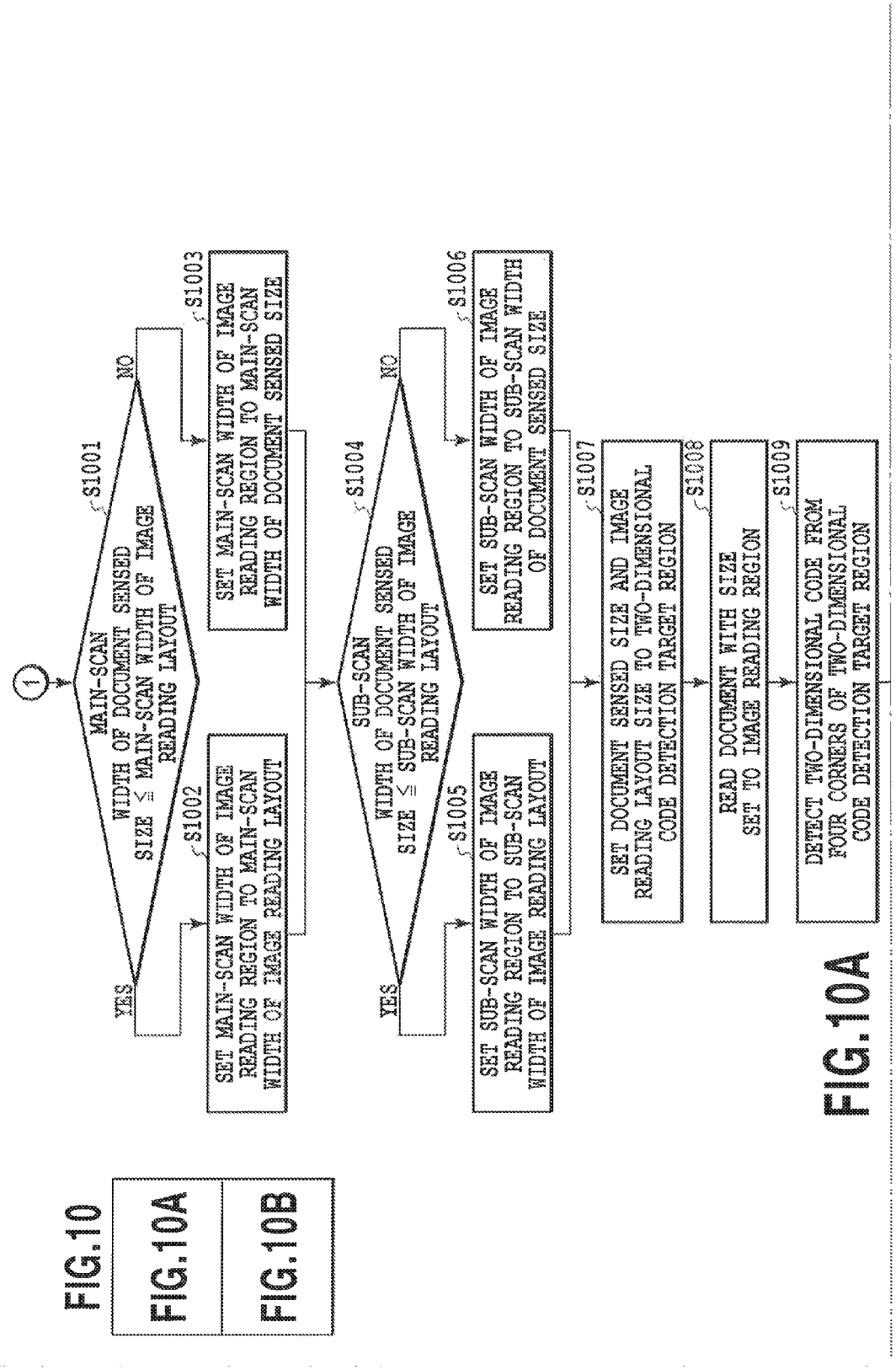

APPARATUS WITH CAPABILITY OF DETECTING TWO-DIMENSIONAL CODE

BACKGROUND OF THE INVENTION

1. Field of the Invention

This invention relates to an apparatus with the capability of detecting a two-dimensional code, and more particularly, to an apparatus with the capability of extracting copy control information embedded in a two-dimensional code, and a control method and a program of the same.

2. Description of the Related Art

In recent times, the issue of unauthorized copying of the document becomes increasingly serious along with the widespread use of copying machines. Techniques of addressing this issue include the techniques of restricting the copying of specific documents. In one of the techniques of restricting the copying of specific documents, a two-dimensional code including copy prohibition information is added to a document. Then, when a copying machine reads the document, it prohibits the document from being coped.

Two-dimensional codes added to documents include QR codes (Registered Trademark). Since this code is square in shape, the visibility of the code itself is high. If the code is added to the whole of image data, the readability of the original document is reduced. To avoid this, the two-dimensional code which is likely to reduce such readability is typically added to a part of the document, specifically, to one or more of the four corners of a sheet of the document.

When a copying machine having the copy prohibition function detects the QR code (Registered Trademark) added to a document, if the region intended to be detected spreads throughout an entire page of the document, it takes much time to perform image processing for code detection. To avoid this, in some cases, for detecting a code, the copying machine checks the four corners of the image read region for detection processing (Japanese Patent Laid-open No. 2008-263283). For example, to read an A4-size document 0101 shown in FIG. 1A, QR codes (Registered Trademark) are detected at the four points of the document, which are the upper left 0102, lower left 0103, upper right 0104 and lower right 0105. Then, if among them, the code including the copy prohibition information is added, the copy prohibition operation is performed.

However, the copy prohibition processing based on such a code may possibly be avoided and then a copy may be made. This event occurs when, for copying an A4-size document, a user specifies an A3 size for an image reading region. In such an event, as shown in FIG. 1B, an A4-size document 0107 shown by the thick line is read as an image of an A3-size region 0106 shown by the thin line. For information, the A3-size region 0106 encompasses the overall region of the A4-size document 0107. Because the image of the A3-size region 0106 is read, the regions on which the code detection processing is performed correspond to the four corners (0108-0111) of the A3-size image reading region, and the code detection processing is not performed on the upper right region 0112 and the lower right 0113 of the A4-size document 0107. As a result, there occurs a problem that even if the code including the copy prohibition information is added to the upper right corner or the lower right corner of the A4-size document, the copy prohibition operation is not performed to enable copying.

SUMMARY OF THE INVENTION

An apparatus according to the present invention comprises: a first setting unit configured to detect a document size and set the detected document size detected; a second setting unit configured to set a document size based on specification from a user; a reading unit configured to read an image on a document table to obtain a read image; a detection unit configured to detect a two-dimensional code from a region within the read image according to the document size set at the first setting unit; and an output unit configured to output the read image according to the document size set at the second setting unit. When the two-dimensional code representing output prohibition is detected at the detection unit, the output by the output unit is stopped.

According to the present invention, even when a document image is read in an image size differing from a detected document size, detection of a two-dimensional code added to the document is achieved.

Further features of the present invention will become apparent from the following description of exemplary embodiments (with reference to the attached drawings).

BRIEF DESCRIPTION OF THE DRAWINGS

FIG. 10 is a diagram showing the relationship of FIGS. 10A and 10B;

FIGS. 10A and 10B are flowcharts showing processing to detect a two-dimensional code executed by the MFP in the embodiment 2;

DESCRIPTION OF THE EMBODIMENTS

Preferred embodiments according to the present invention will be described below with reference to the accompanying drawings.

Embodiment 1

Embodiment 1 relates to control for enabling detection of a two-dimensional code when a copying machine having the copy prohibition function is used to read an image in a setting of a paper size different from a size of a document loaded on the copying machine.

Initially, terms used in the embodiment will be explained. Copy control information is added to documents by copying. The copy control information can include copy prohibition information and copy permission information. The copy prohibition information is information indicating that copies are prohibited and the copy permission information is information indicating that copies are permitted. To copy a document with the copy control information added thereto, the copy control information can be referred to perform the control to prohibit or permit the copy of the document.

Next, processing of creating a document to which the copy control information is added will be described. First, the copy control information is encoded to obtain embedded information. Next, the embedded information is imaged to generate a two-dimensional code. Third, the two-dimensional code and a document image are synthesized to generate a document image with the two-dimensional code synthesized. Finally, the document image with the two-dimensional code synthesized is printed. In this manner, a document to which the copy control information is added in the form of two-dimensional codes is created. This series of processing is called "addition" of the copy control information. The processing of encoding and imaging the copy control information (thus generating a two-dimensional code) is referred to as two-dimensional encoding of copy control information.

In the following embodiments including the embodiment 1, the processing will be described by taking a form of using two-dimensional codes as described above (specifically, a form of printing after a two-dimensional code is synthesized on a document image, and a form of reading a document obtained by the printing and controlling the coping) as an example.

In the embodiment; QR codes (Registered Trademark) are used as two-dimensional codes, and one two-dimensional code is added to one sheet surface of a document.

Figure 2:
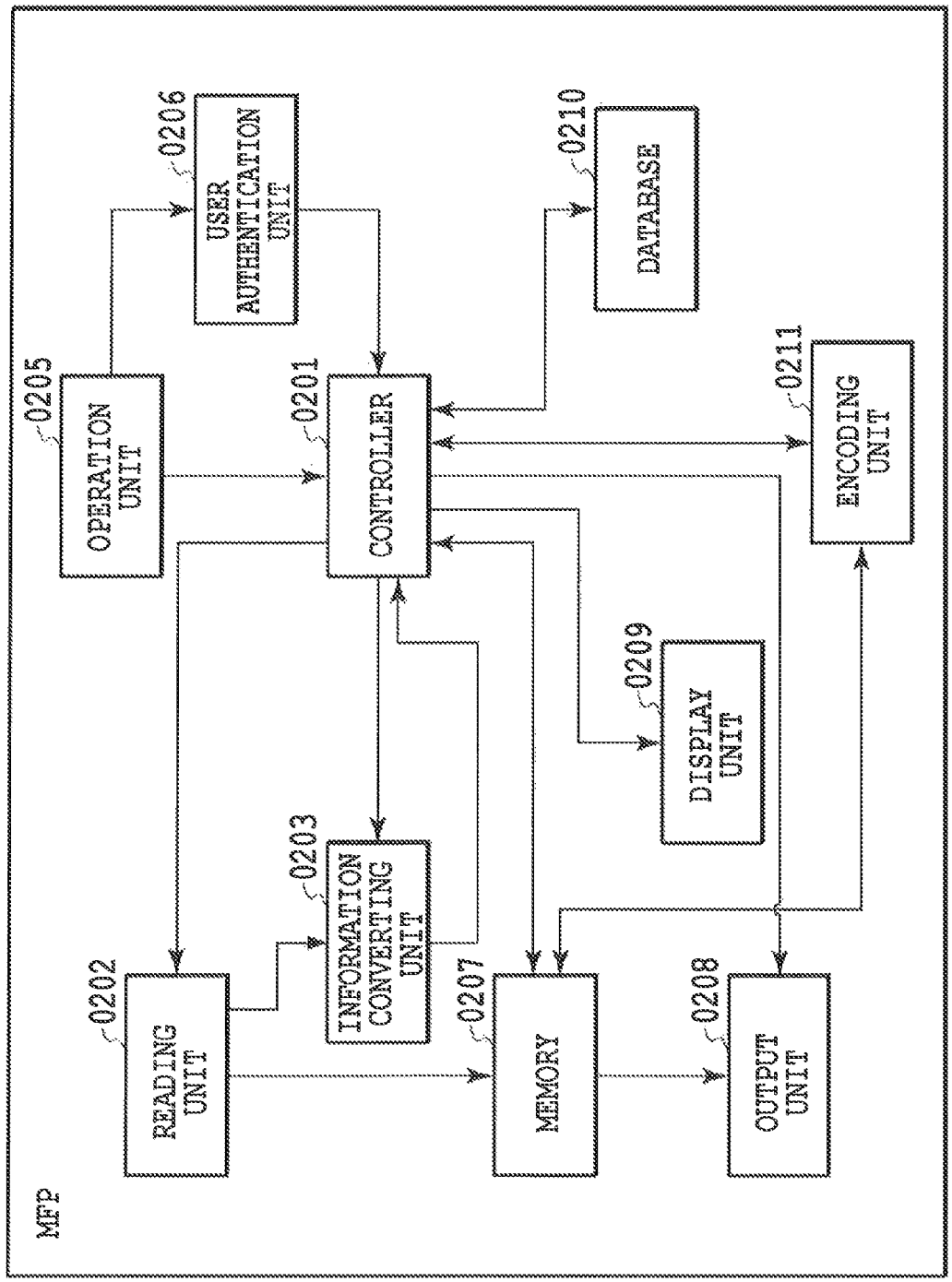
FIG. 2 is a block diagram of a Multi Functional Peripheral (MFP) in an embodiment according to the present invention.

The configuration of the MFP (image forming apparatus) in the embodiment 1 will be described below in detail with reference to FIG. 2. FIG. 2 is a block diagram illustrative of the configuration of the MFP according to the embodiment.

A controller 0201 controls the operation of each unit of the MFP. The controller 0201 has a CPU (Central Processing Unit, not shown). The controller 0201 as capable of controlling the processing for addition of copy control information and the processing for detection of copy control information including decoding of embedded information.

An operating unit 0205 accepts operation inputs from the user to the MFP. A user authentication unit 0206 manages information required for authentication of the user using the MFP. For example, the user authentication unit 0206 can use user information included in copy control information and the like for user authentication.

A reading unit 0202 reads a document through, for example, a scanner, and generates a document image of the read document. A document is a paper document such as printed matter or the like, whereas a document image is digital (or analog) data.

An information converting unit 0203 finds a two-dimensional code from the document image for information conversion. A memory 0207 stores the document image. An output unit 0208 reads out the document image from the memory 0207 and then prints the document image or produces an output such as transmission of the document image to an external apparatus or the like, in this case, the external apparatus refers to a personal computer or the like which is connected to the MFP via a network.

A display unit 0209 produces the display on the screen under the control of the controller 0201. A database 0210 stores print settings and a use log of the MFP. An encoding unit 0211 performs encoding and imaging of the copy control information.

Next, processing for detecting copy control information from a document image will be described. The information converting unit 0203 detects position detection symbols (finder pattern) located at corners of a QR code (Registered Trademark) (hereinafter referred to as a "two-dimensional code") from the document image. If the finder pattern is present, the information converting unit 0203 determines that a two-dimensional code is in the document image. This refers to finding of a two-dimensional code. Next, the found two-dimensional code is converted into information to obtain embedded information. Finally, the controller 0201 which has found the two-dimensional code decodes the embedded information included in the two-dimensional code. By thus decoding, the controller 0201 can gain the copy control information.

As described above, a series of processing of finding a two-dimensional code from a document image, then converting the found two-dimensional code into information to obtain embedded information, and then decoding the embedded information to obtain copy control information is called "detection" of copy control information. By performing the detection processing, the copy control information can be obtained from the document image. For example, it can be assumed that the embedded information includes an error correcting code, but the copy control information does not include an error correcting code.

Figure 1B:
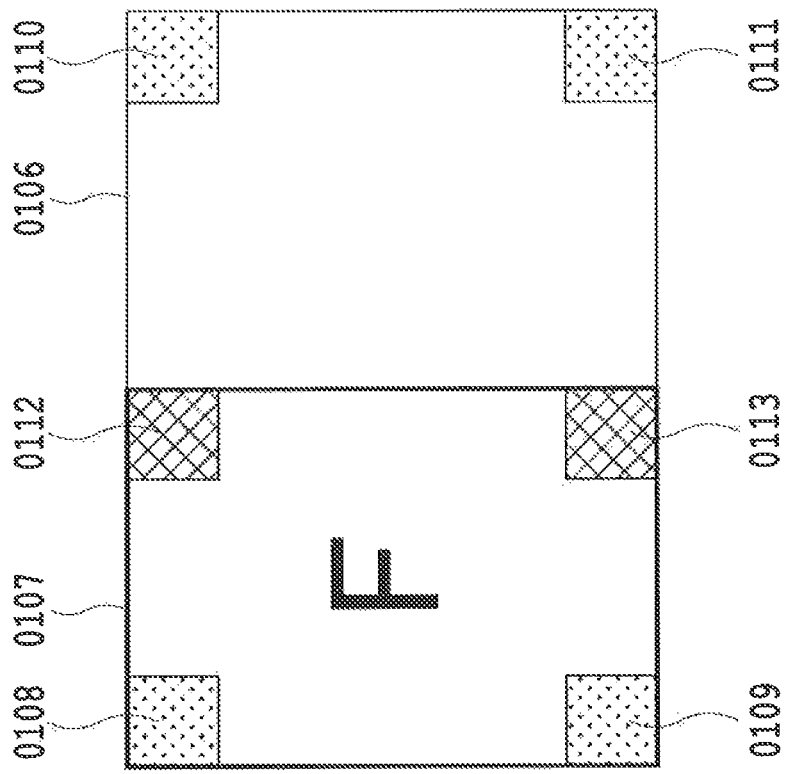
FIG. 1A and FIG. 1B are diagrams showing regions for a detection processing target of a QR code (Registered Trademark)
Figure 1A:
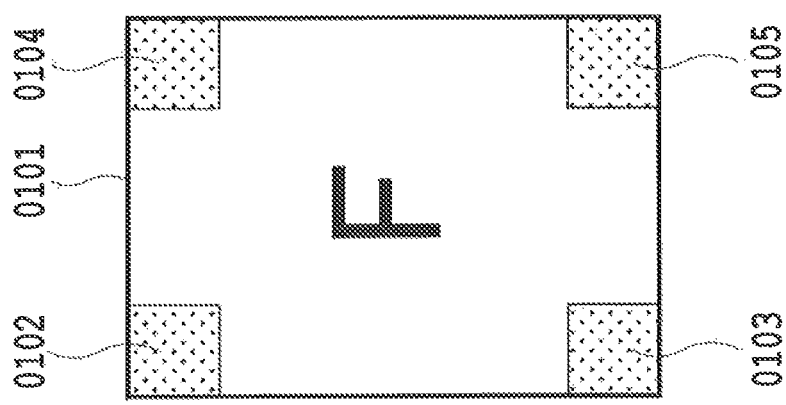

Next, the terms used in the two-dimensional code detection processing in the embodiment will be described. When the MFP copies the document, the reading unit 0202 determines what size document is placed on the document table by use of a sensor (for example, a transmissive sensor) or the like. The document size determined by the reading unit 0202 is called a "document sensed size". The transmissive sensor is described in, for example, FIG. 1 (104) in Japanese Patent Application No. 2010-175540 filed by the applicant. Note that the reading unit 0202 comprises a CCD sensor and a plurality of transmissive sensors receiving infrared light. This MFP is capable of reading (or scanning) an image by use of the CCD sensor, and estimating in which position the document is placed on the basis of whether or not each transmissive sensor receives infrared light to determine a document size.

In a case of copying a document with the MFP, the MFP performs processing based on the document sensed size retrieved from the reading unit 0202, and information on a size of a paper (paper size) used in copying and a scaling factor which are input through the operation unit 0205 by the user. Specifically, based on the document sensed size and the information on the paper size and the scaling factor, the controller 0201 makes determinations about a range of an image read from the document at the reading unit 0202 and a range of printing at the output unit 0208. The range of the image read, at the reading unit 0202, which is determined from the document sensed size, the paper size and the scaling factor by the controller 0201 is called "image reading layout", and similarly, the image size when the output unit 0208 performs printing is called an "output image size". The range of the image read from the reading unit 0202 when the MFP actually performs copying (that is, generates an output image) is called an "image reading region". The image reading region is the same as the region of the image reading layout, the region of the image sensed size, or the combination of both as described later.

Next, a method of determining the image reading layout and the output image size will be described. The "output image size" is a size of the image printed on a paper sheet in the copying operation. If the user inputs a paper size used in copying through the operation unit 0205, the user-specified paper size results in the output image size. If the user does not specify a paper size, the output image size is determined from the document sensed size and the setting of the scaling factor. In this case, a smallest paper size (standard size) available for printing an image generated by zooming in or out the image of the document sensed size by the set scaling factor is selected, and the selected paper size (standard size) is determined as the output image size. The "image reading layout" is determined such that the size of the image generated by zooming in or out the image read by the reading unit 0202 by the set scaling factor becomes equal to the output image size. For example, when the output image size is A4 and a scaling factor is 1:1 (100%, the reading image layout also results in A4. When the output image size is A4R and the scaling factor is set at 70%, the reading image layout results in A3, so that the A3-size document is scaled down to fit on the A4R size and then copied.

In regular copy processing, the region of the image reading layout determined in this manner is used as the image reading region.

Next, control for enabling detection of a two-dimensional code when a document size and an image reading region of the MFP differ from each other will be described. Specifically, a description will be given of processing of detection of a two-dimensional code when the size of the document placed on the document table differs from the size read in the actual copying operation (specifically, a size specified by user input).

Figure 3:
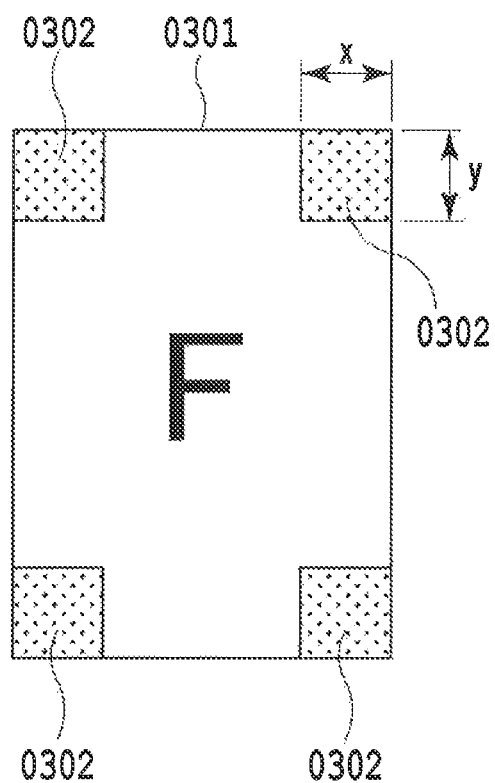
FIG. 3 is a diagram showing a region for detection processing target of a two-dimensional code, in an image to be read.

In detection of a two-dimensional code in the MFP, typically, the detection processing is performed in four corners of a two-dimensional code detection region of an image read by the reading unit 0202. In the example in FIG. 3, the whole of the read image 0301 is a region in which two-dimensional code detection is performed, and a region 0302 within a certain range from each of the four corners is a target for actual detection processing. Of the read image, an image range in which the processing to detect a two-dimensional code (the image 0301 in FIG. 3) is assumed to be a target for two-dimensional code detection, and this range is called a "two-dimensional code detection target region". Actually, the two-dimensional code detection processing is performed in the region 0302 in a certain range in each of the four corners of the two-dimensional code detection target region 0301. This range in each corner in which a two-dimensional code is detected may have a fixed size or a user-definable size.

Next, an operation when a document size and an image reading region of the MFP differ from each other, in the embodiment, will be described with reference to FIGS. 4A and 4B.

Figure 4A:
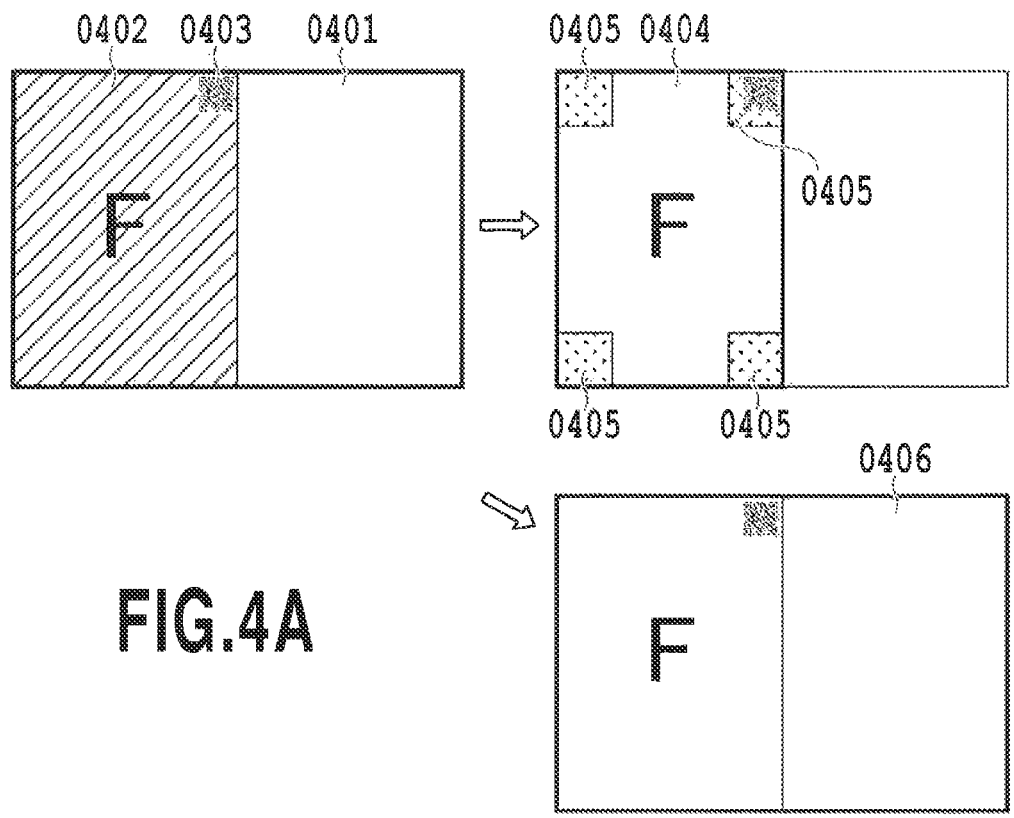
FIG. 4A is a diagram illustrating an example of a detection target region of a two-dimensional code when an A4-size document is copied using an A3-size image reading region in embodiment 1.
Figure 4B:
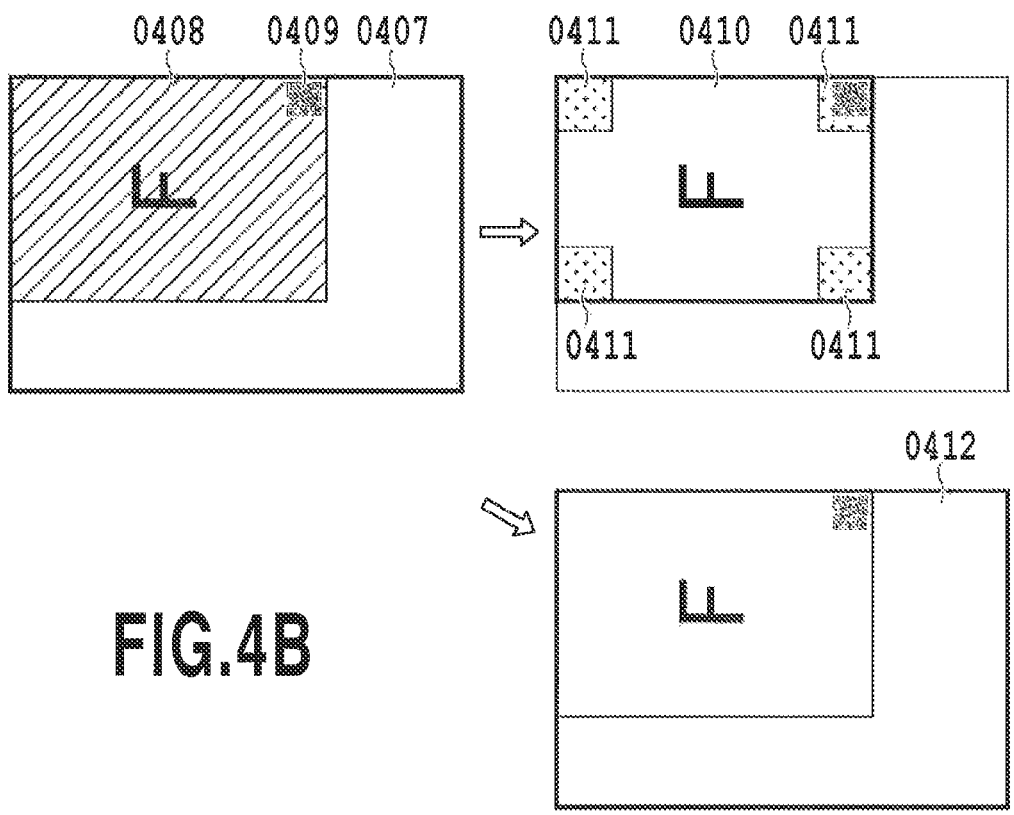
FIG. 4E is a diagram illustrating an example of a detection target region of a two-dimensional code when an A4-size document is copied using an A3-size image reading region in the embodiment 1.

FIG. 4A is a diagram when an A4-size document is copied, while FIG. 4B is a diagram when an A4-size document is copied. In either case, two-dimensional codes 0403, 0409 are added respectively to the upper right corners of documents 0402 and 0408. It is assumed that a paper size is set to an A3 size by user input. That is, FIG. 4A and FIG. 4E are diagrams showing examples of copying a document onto a paper sheet of a size larger than the document sensed size by user input. Alternatively, FIG. 4A and FIG. 4B may be diagrams showing examples of copying a document onto a paper sheet of a size encompassing the document sensed size by user input.

In this case, to perform the processing of copying in an A3 size, the image reading layout determined by the controller 0201 is of an A3 size. For this reason, in the example in FIG. 4A, with respect to the region 0401 of the image reading layout (range surrounded with the thick line), a region of the document 0402 (hatched range) is located in the left of the region 0401. Likewise, in the example in FIG. 4B, with respect to the region 0407 of the image reading layout (range surrounded with the thick line), a region of the document 0408 (hatched range) is arranged on the upper left corner of the region 0407. In both the examples, the image reading region read by the reading unit 0202 is the same as the region of the image reading layout.

At this stage, if the controller 0201 sets the region of the image reading layout to the two-dimensional code detection target region, then the two-dimensional codes 0403, 0409 are not detected as two-dimensional codes, because they are not located in the four corners. To avoid this, in the embodiment, using the document sensed size retrieved from the reading unit 0202, the two-dimensional code detection target region is set as an A4-size region 0404 in the example in FIG. 4A and as an A4R-size region 0410 in the example in FIG. 4B. In other words, the controller 0201 does not set the region of the image reading layout as a two-dimensional code detection target region, but sets the region determined from the document sensed size as a two-dimensional code detection target region. As a result, the two-dimensional code detection processing is preformed on the four corners 0405 of the region 0404 corresponding to the A4-size document in the example in FIG. 4A, allowing the detection of the two-dimensional code 0403 added to the document. Likewise, in the example in FIG. 4B, the two-dimensional code detection processing is performed on the four corners 0411 of the region 0410 corresponding to the A4R-size document, allowing the detection of the two-dimensional code 0409 added to the document. On the other hand, a read image used in copying (that is, the image of the image reading region) is set as an image of the region of the image reading layout, corresponding to an A3-size image region 0406 in the example in FIG. 4A and an A3-size image region 0412 in the example in FIG. 4B. As a result, even if a document is copied in an output size specified by user input, detection of a two-dimensional code located in a predetermined region of the document is made possible.

Next, an operation of copying an A3-size document on the A4-size setting in reverse of FIGS. 4A, 4B will be described with reference to FIG. 5. In other words, the operation of copying a document in a size smaller than the document sensed size by user input will be described.

Figure 5:
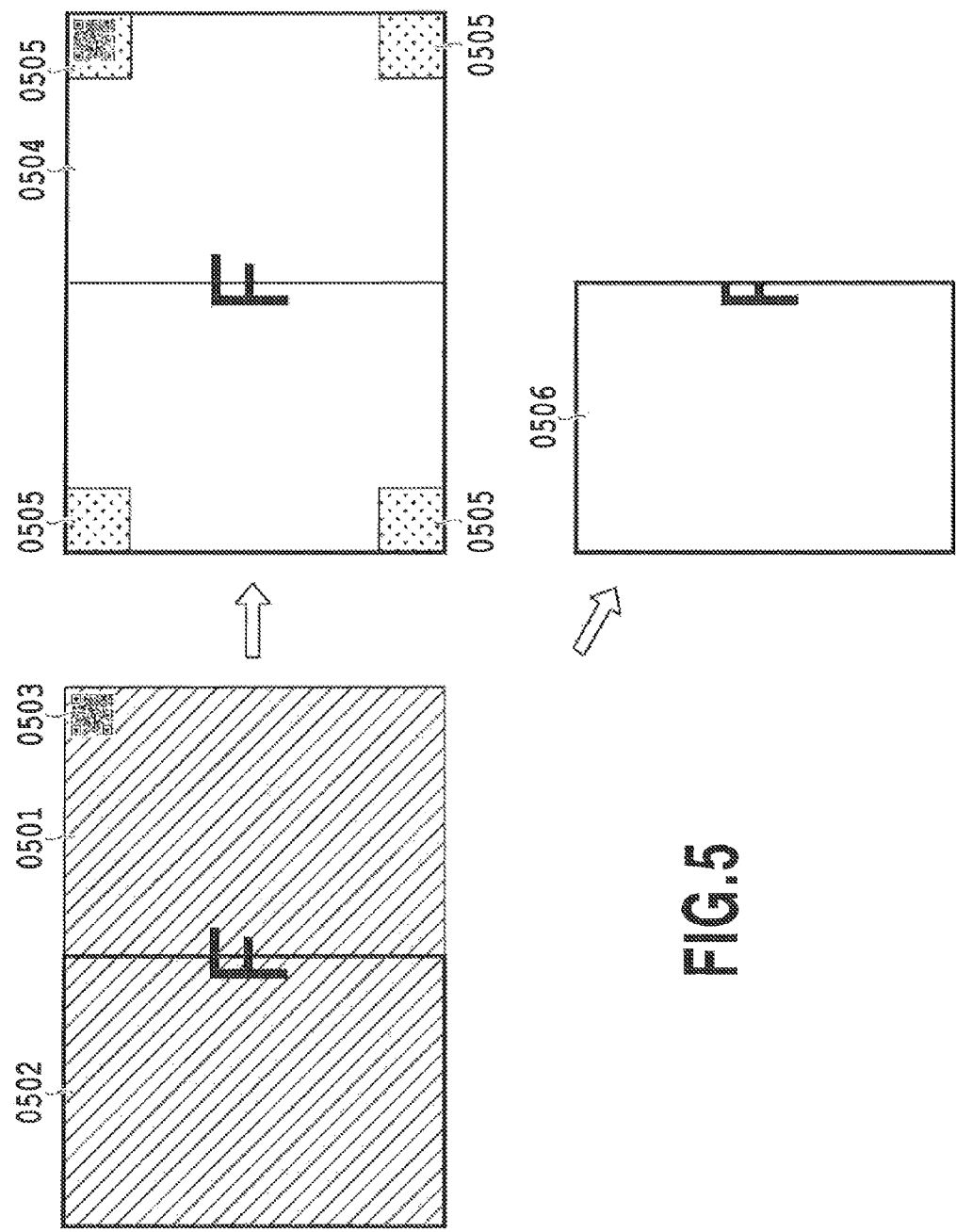
FIG. 5 is a diagram illustrating an example of a detection target region of a two-dimensional code when an A3-size document is copied using an A4-size image reading region in the embodiment 1.

FIG. 5 is a diagram when an A3-size document is copied, in which a two-dimensional code 0503 is added to the upper right corner of an A3-size document 0501 (shown by sloped lines). When an A4 size is input by the user specifying a paper size, for performing the processing of copying in an A4 size, the image reading layout determined by the controller 0201 is of an A4 size, resulting in a region 0502 shown by a thick line located in the left of the A3-size document 0501. On the other hand, for an image reading region, the controller 0201 performs a comparison between a region (document 0501) of a document sensed size retrieved from the reading unit 0202 and a region 0502 of an image reading layout, and then the image reading region results in a region of the A3-size document 0501 which is a wider region.

In this case, a two-dimensional code detection target region is determined to be an A3-size region 0504 by use of the document sensed size retrieved from the reading unit 0201. As a result, the two-dimensional code detection processing is performed on four corners 0505 of the A3-size document region 0504, making it possible to detect the two-dimensional code 0503 added to the document. On the other hand, a read image used in copying is determined to be in the A4-size region 0506 obtained by cutting the image reading layout region from the A3-size image reading region 0501. As a result, even if a document is copied in an output size specified by user input, detection of a two-dimensional code located in a predetermined region of the document is made possible.

Next, an operation of copying an A4R-size document in A4-size setting will be described with reference to FIG. 6. In other words, a description will be given of the operation of copying the document in size of a side smaller than the document sensed size and another side larger than it.

Figure 6:
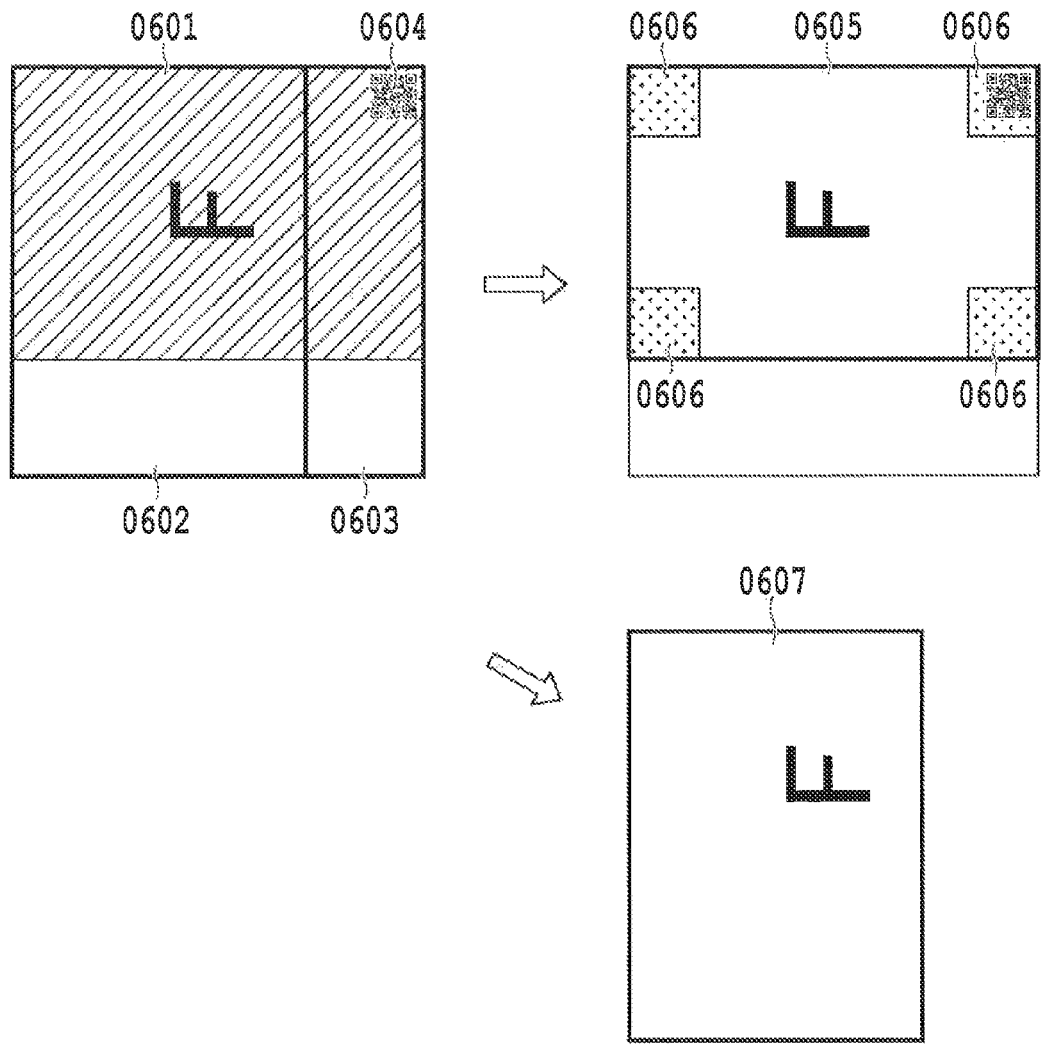
FIG. 6 is a diagram illustrating an example of a detection target region of a two-dimensional code when an A4R-size document is copied using an A4-size image reading region in the embodiment 1.

FIG. 6 is a diagram when an A4R-size document is copied, in which a two-dimensional code 0604 is added to the upper right corner of the A4R-size document 0601 (shown by sloped lines). If an A4-size paper size is specified by user input, the processing of copying in the A4 size is performed. Accordingly, an image reading layout determined by the controller 0201 is of an A4 size, resulting in an A4-size region 0602 extending on a basis of the upper left corner of the A4R-size document 0601.

For an image reading region read by the reading unit 0202, the controller 0201 performs a comparison between a region (document 0601) of a document sensed size retrieved from the reading unit 0202 and a region 0602 of an image reading layout, resulting in becoming a region 0603 encompassing both the regions. In other words, the image reading region is the region 603 shown by a thick line, encompassing the hatched region and the blank region.

At this stage, by use of the document sensed size retrieved from the reading unit 0202, the two-dimensional code detection target region is determined to be an A4R-size region 0605 (shown by a thick line). As a result, the two-dimensional detection processing is performed on the four corners 0606 of the A4-size region 0605, making it possible to detect the two-dimensional code 0604 added to the document. On the other hand, a read image used in copying is determined to be in the A4-size region 0607 obtained by cutting the image reading layout region from the image reading region 0603.

Figure 7:
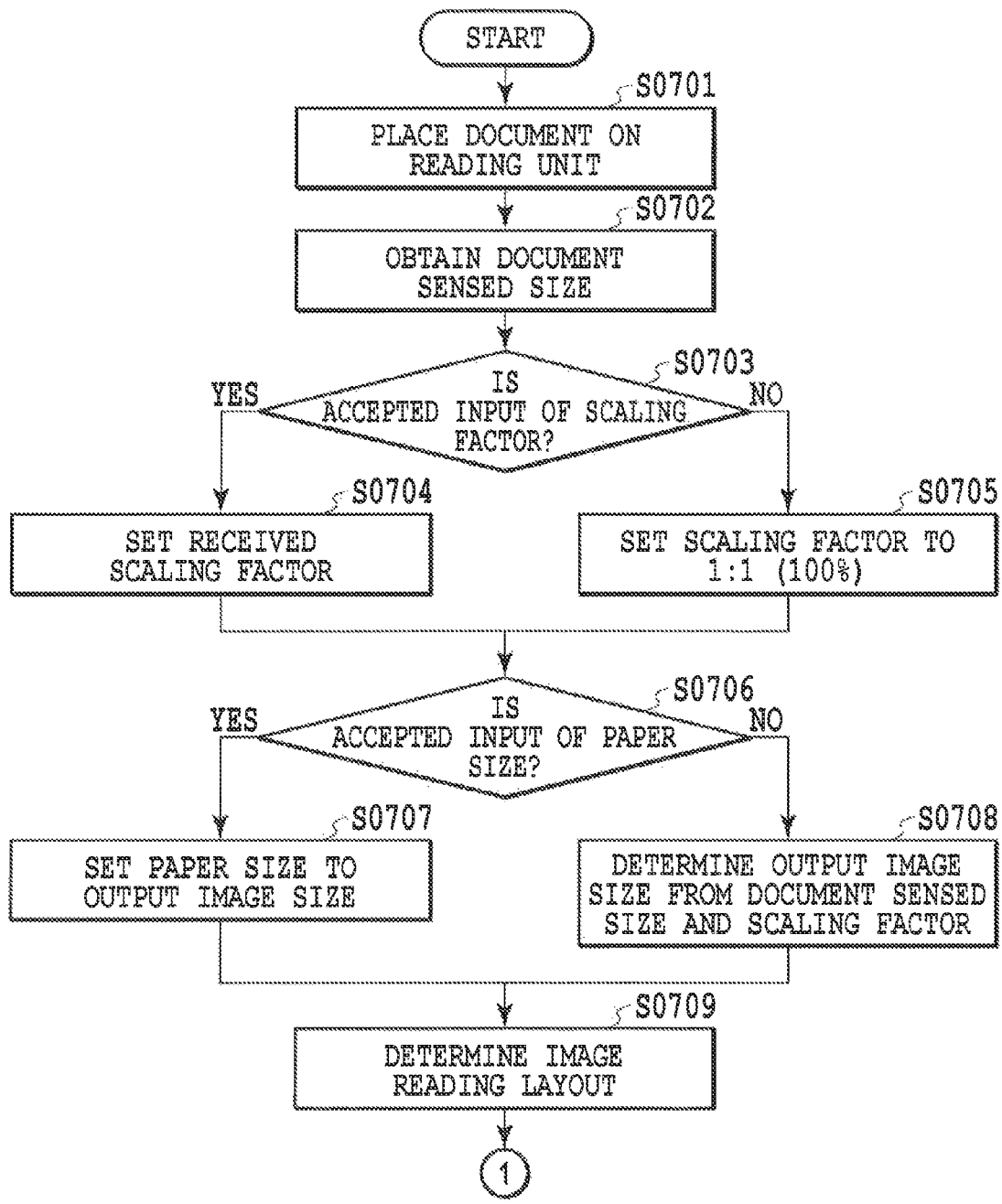
FIG. 7 is a flowchart showing processing to detect a two-dimensional code executed by the MFP in the embodiment 1.
Figure 8:
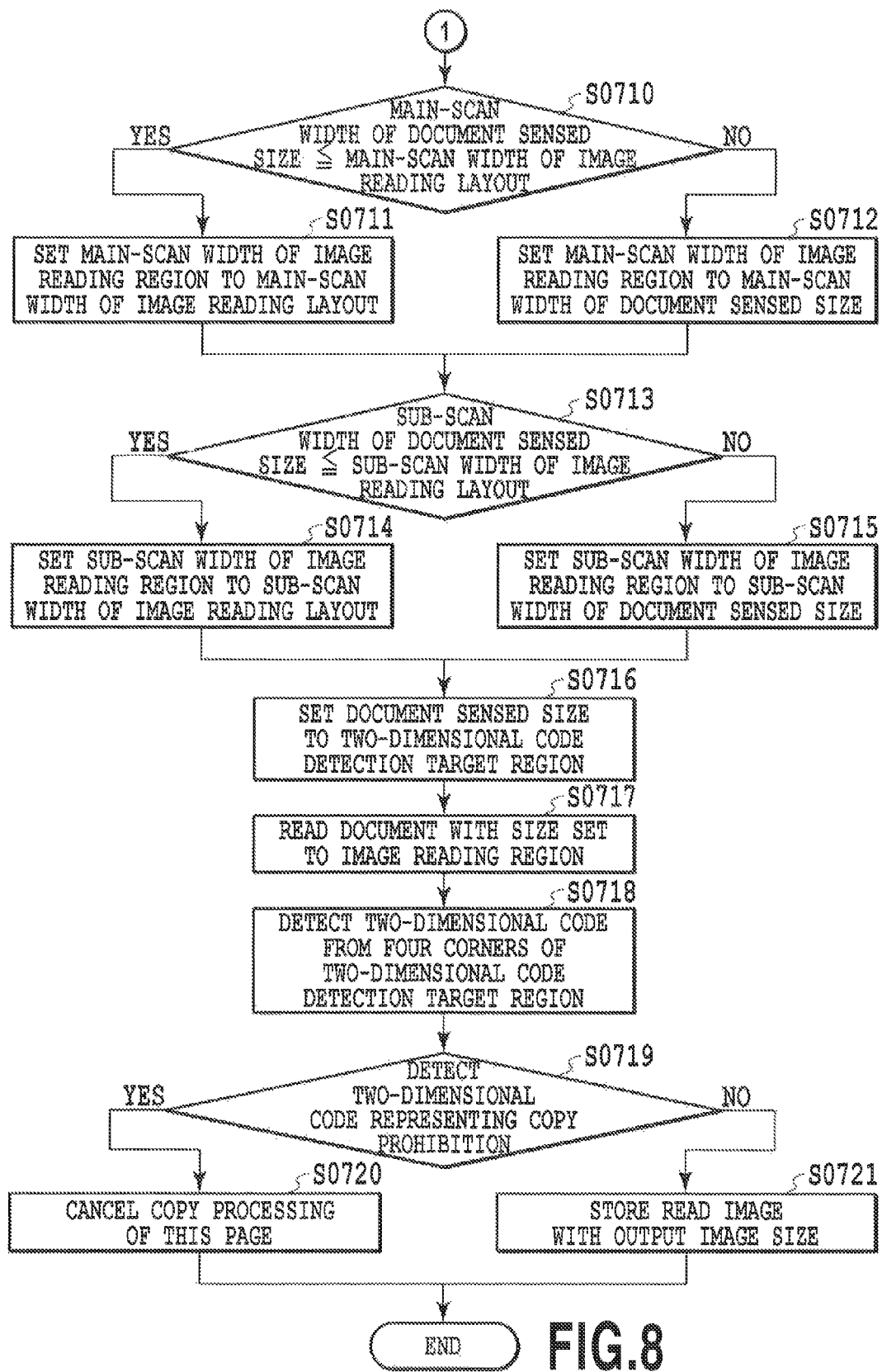
FIG. 8 is a second flowchart showing processing to detect a two-dimensional code executed by the MFP in the embodiment 1.

Next, control of a two-dimensional code detection operation in image reading processing when a document size and an image reading region of the MFP differ from each other will be described in detail with reference to FIG. 7 and FIG. 8. FIG. 7 and FIG. 8 are flowcharts showing the control flow of the two-dimensional code detection operation performed by the MFP in the embodiment.

The user who intends to copy an image with a two-dimensional code added thereto places first a document on the reading unit 0202 (S0701). Upon placement of the document, the reading unit 0202 uses the sensors to determine a document size of the placed document, and then transmits the obtained document size (document sensed size) to the controller 0201 (S0702). Detecting and setting the document sensed size may be referred to as first setting processing. Then, the operation unit 0205 accepts the input of a scaling factor from the user (S0703). If the scaling factor is input from the user, the operation unit 0205 transmits the received scaling factor to the controller 0201. The controller 0201 sets the received scaling factor as a copy scaling factor (S0704). If the scaling factor is not input from the user, the controller 0201 determines the copy scaling factor to be 1:1 (100%) (S0705). Then, the operation unit 0205 accepts the input of a paper size from the user (S0706). If the paper size is input from the user, the operation unit 0205 transmits the received paper size to the controller 0201. The controller 0201 sets the received paper size to an output image size (S0707). If the paper size is not input from the user, the controller 0201 determines to be the output image size, a smallest paper size available for printing an image produced by scaling the document sensed size determined in S0702 by the set scaling factor (S0708). The controller 0201 determines an image reading layout which is a reading range of an image used in copying from the scaling factor set in steps S0703-S0705 and the output image size set in steps S0706-S0708 (S0709). The operation unit 0205 determines the image reading layout such that an image size of the image produced by scaling the read image by the set scaling factor is to be in agreement with the output image size. Determining and setting the image reading layout specified by user input may be referred to as second setting processing.

Subsequently, turning to FIG. 8, the controller 0201 performs a comparison between the document sensed size obtained in step S0702 and the image reading layout determined in step S0709, and determines an image reading region which is a range in which the reading unit 0202 reads the image.

First, the controller 0201 performs a length comparison between a main-scan width of the document sensed size and a main-scan width of the image reading layout (S0710). As a result of the comparison at step S0710, if the main-scan width of the image reading layout is longer or equal, the controller 0201 determines the main-scan width of the image reading layout to be a main-scan width of the image reading region (S0711). As a result of the comparison at step S0710, if the main-scan width of the document sensed size is longer, the controller 0201 determines the main-scan width of the document sensed size to be the main-scan width of the image reading region (S0712).

Likewise, also in regard to a sub-scan width, the controller 0201 performs a length comparison between a sub-scan width of the document sensed size and a sub-scan width of the image reading layout (S0713). As a result of the comparison at step S0713, if the sub-scan width of the image reading layout is longer or equal, the controller 0201 determines the sub-scan width of the image reading layout to be a sub-scan width of the image reading region (S0714). As a result of the comparison at step S0713, if the sub-scan width of the document sensed size is longer, the controller 0201 determines the sub-scan width of the document sensed size to be the sub-scan width of the image reading region (S0715). In this manner, the size of the image reading region is determined.

Then, the controller 0201 sets the document sensed size determined in step S0702 to the two-dimensional code detection target region for use in the information converting unit 0203 (S0716). After completion of the setting of the two-dimensional code detection target region in step S0716, the controller 0201 reads the document image from the reading unit 0202 on the basis of the size of the image reading region determined in steps S0710-S0715 (S0717). That is, the document image is read with the size of the image reading region which is the size encompassing both the document sensed size and the image reading layout. The image thus read can be referred to as a read image. In regard to the document image read in step S0717, the information converting unit 0203 performs, based on the two-dimensional code detection target region set in step S0716, the processing to detect a two-dimensional code from the four corners of the two-dimensional code detection target region on the read document image. That is, the two-dimensional detection processing is performed, beginning with the four corners of the two-dimensional code detection target region (within the read image) which is of the document sensed size. Then, the information converting unit 0203 transmits the copy control information of the detected two-dimensional code to the controller 0201 (S0718). If the copy control information in the two-dimensional code which has been received from the information converting unit 0203 in step S0718 is copy prohibition information, the controller 0201 stops the copy processing on the corresponding page and then terminates the processing (S0719, S0720). In short, the disabling output processing can be performed for the corresponding page. On the other hand, if the copy control information in the two-dimensional code which has been received from the information converting unit 0203 in step S0718 is copy permission information, the controller 0201 stores the document; image read by the reading unit 0202 in the output image size in the memory 0207, and then terminates the processing (S0719, S0721). The stored image is read from the memory 0207 for use in the output processing.

The foregoing description is given of the control for the two-dimensional code detection in the image reading in the MFP when a document size and an image reading region differ from each other. Because of this control, even if a document size and an image reading region differ from each other, the detection of the two-dimensional code added to the document is made possible.

Embodiment 2

Embodiment 2 according to the present, invention relates to control for enabling detection of two-dimensional codes of a document when an image of the document to which a plurality of the two-dimensional codes are added is read in settings of a size differing from the document size on a copying machine having the copy prohibition function. Also, the embodiment 2 relates to control for enabling detection of two-dimensional codes of a document when, relating to a plurality of stacked paper documents, an image of the document is read in settings of a size differing from the document size.

Figure 9:
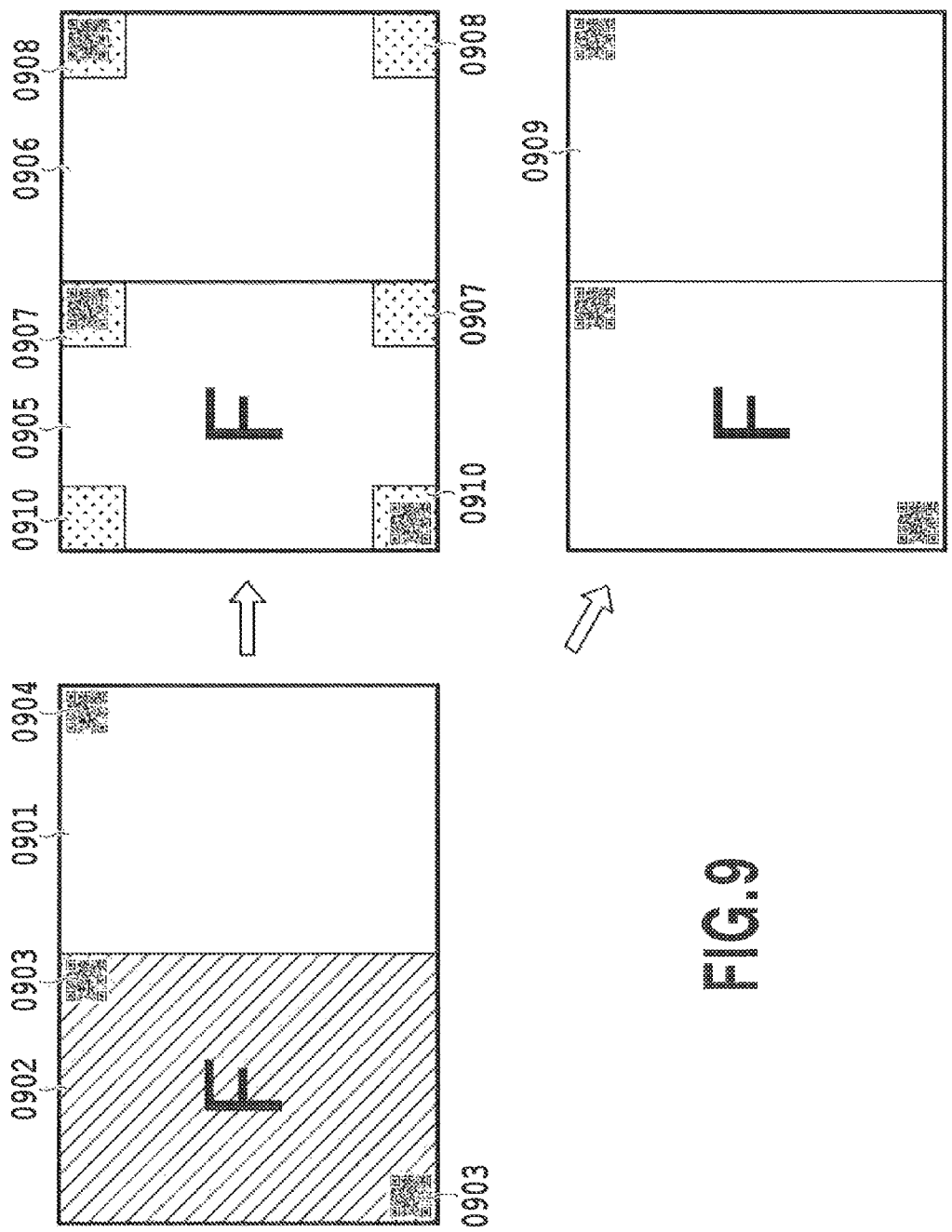
FIG. 9 is a diagram illustrating an example of a detection target region of a two-dimensional code when an A4-size document with a plurality of two-dimensional codes added thereto is copied using an A3-size image reading region in embodiment 2.

Initially, differences in operation from the embodiment 1 are described with reference to FIG. 9. FIG. 9 is a diagram of copying an A4-size document. The document 0902 (shown by oblique lines) is of an A4 size, in which two-dimensional codes 0903 are added to the upper right corner and the lower left corner of the document. A two-dimensional code 0904 is printed on a paper sheet other than the document 0902, and this paper sheet is placed side by side with the document but is not detected through the document detection of the reading unit 0202. That is, it is assumed that the user intends to copy the document while, for example, an A3-size document is placed on the A4-size document 0902, but the A3-size document is not detected through the document detection in the reading unit 0202.

In this situation, it is assumed in the example in FIG. 9 that an A3 size is specified as a paper size by user input. In this case, since the copy processing with an A3 size is performed, the image reading layout determined by the controller 0201 is of an A3 size. In the example in FIG. 9, the image reading layout is determined such that, with respect to the region 0901 of the image reading layout, the region of the document 0902 is located in the left of the region of the image reading layout. The image reading region read by the reading unit 0202 is identical with the region of the image reading layout.

In this case, as the two-dimensional code, there are two two-dimensional codes 0903 added to the A4-size document 0902, and a two-dimensional code 0904 added to the A3-size paper sheet which is not detected. Since the A4-size region using the document sensed size is defined as the two-dimensional code detection target region in the technique in the embodiment 1, the two-dimensional code 0904 may possibly not be detected.

To avoid this, in the embodiment 2, the two-dimensional code detection target region can be defined as both of the regions, which are the A4-size region 0905 using the document sensed size obtained from the reading unit 0202, and the A3-size region 0906 using the image reading layout. The region 0906 encompasses the region 0905. As a result, the two-dimensional code detection processing is performed on the four corners (0907, 0910) of the A4-size region 0905, and the four corners (0908, 0910) of the A3-size region 0906, so that, detection of the two-dimensional codes 0903 and 0904 added to the documents can be achieved. On the other hand, the read image used in copying corresponds to the image of the region of the image reading layout, which is an A3-size region 0909.

In the embodiment 2, a plurality of the two-dimensional codes are detected. Of the detected two-dimensional codes 0903, 0904, the two-dimensional codes 0903 detected from the two-dimensional code detection target region 0905 of the document 0902 sensed by the document detection can be used preferentially as a two-dimensional code used in copy control. That is, preferential use of the two-dimensional code included in the region of the document sensed size detected by the apparatus is achieved. When a plurality of two-dimensional codes are detected from the two-dimensional code detection target region 0905 of the document 0902 sensed through the document detection, copy control information in a two-dimensional code created at the oldest date and time in date information included in the copy control information in the two-dimensional code can be preferentially used. If copy prohibition information is included in the copy control information in either of the two-dimensional codes, the copy prohibition processing may be performed directly without making reference to the date information.

Figure 10B:
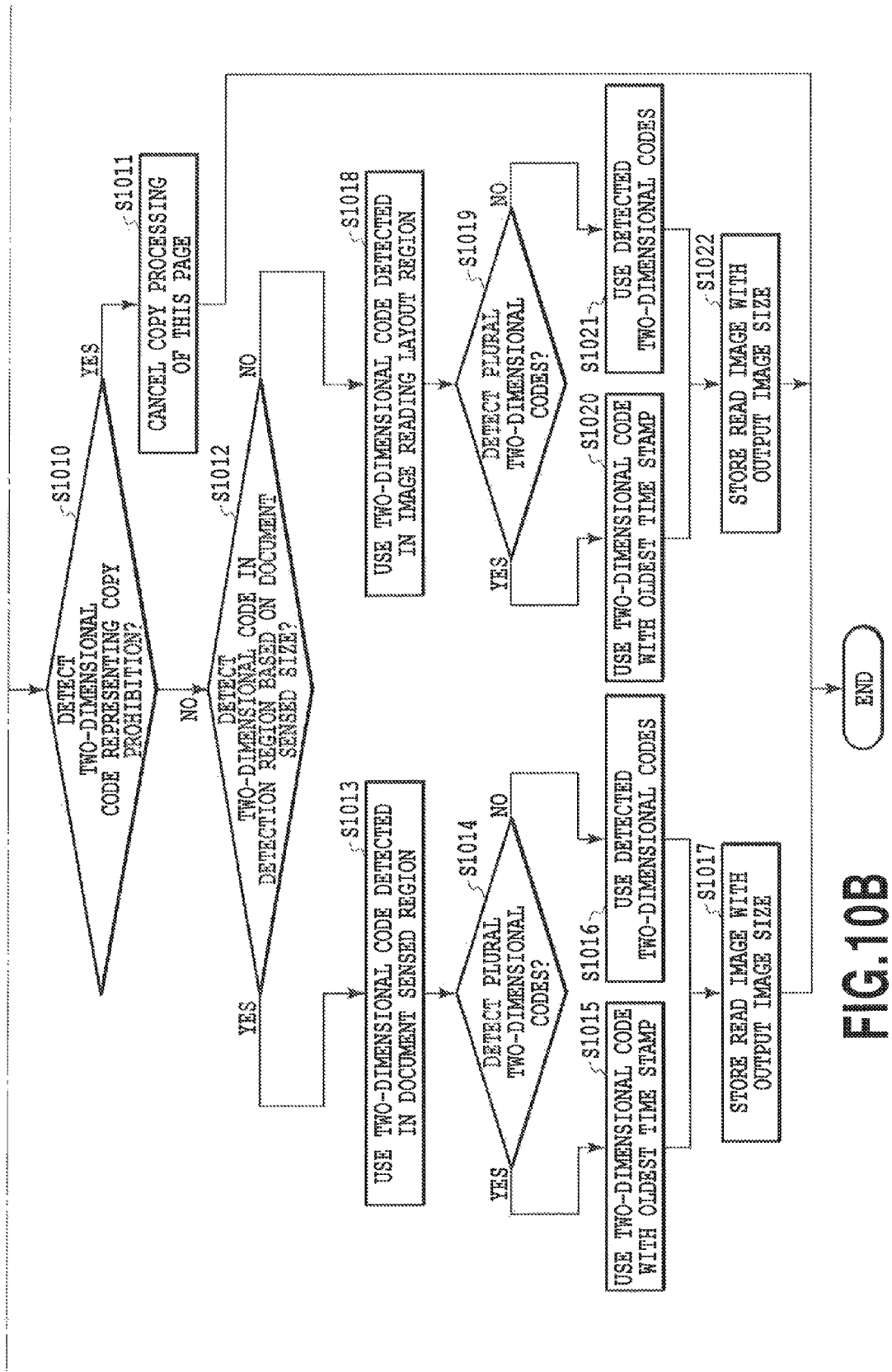

Next, control of a two-dimensional code detection operation in the embodiment 2 will be described in detail with reference to FIGS. 10A and 10B. FIGS. 10A and 10B are flowcharts showing the control flow of the two-dimensional code detection operation performed by the MFP in the embodiment. The processing steps shown in FIG. 7 are in common with the embodiment 2. In the control in FIGS. 10A and 10B, differences from the flowchart in FIG. 8 are the processing in step S1007 instead of step S0716, and additional processing in steps S1012-S1022. Now, changes from the embodiment 1 are described.

At step S1007, the controller 0201 specifies the two-dimensional code detection target region for use in the information, converting unit 0203. In the embodiment, the size of the image reading layout determined in step S0709 in addition to the document sensed size determined, in step S0702 is specified for the two-dimensional code detection target region (S1007). Thus, the information converting unit 0203 performs the processing to detect two-dimensional codes at the four corners of each of the two two-dimensional code detection target regions of the regions based on the document sensed size and on the image reading layout which are specified in step S1007 (S1009).

Then, if the copy control information in the two-dimensional code which has been transmitted from the information converting unit 0203 in step S1009 is copy prohibition information, the controller 0201 stops the copy processing on the corresponding page and then terminates the processing (S1010, S1011). On the other hand, if the copy control information in the two-dimensional code which has been transmitted, from the information converting unit 0203 in step S1009 is copy permission information, the controller 0201 determines whether the detected two-dimensional code is detected in the two-dimensional code detection target region based on the document sensed size or the two-dimensional code detection target region based on the image reading layout (S1010, S1012).

As a result of step S1012, if the two-dimensional code detected in the two-dimensional code detection target region based on the document sensed size is included in the detected two-dimensional codes, the controller 0201 is allowed to use the copy control information in the two-dimensional code detected in the detection target region based on the document sensed size (S1012, S1013). If a plurality of the two-dimensional codes detected in the detection target region based on the document sensed size are included, the controller 0201 can use the copy control information in the two-dimensional code having the oldest date and time in the date information included in the copy control information included in the detected two-dimensional codes (S1014, S1015). If only one two-dimensional code is detected in the detection target region based on the document sensed size, the controller 0201 can use the copy control information in the corresponding two-dimensional code (S1014, S1016).

As a result of steps S1012-S1016, if the copy control information in the two-dimensional code to be used is determined, the controller 0201 stores the document image read by the reading unit 0202 with the output image size in the memory 0207, and then terminates the processing (S1017). The stored image is read from the memory 0207 for use in the output processing.

As a result of step S1012, if no two-dimensional code detected in the two-dimensional code detection target region based on the document sensed size is included in the detected two-dimensional codes, the controller 0201 is allowed to use the copy control information in the two-dimensional code detected in the detection target region based on the size of the image reading layout (S1012, S1018). If a plurality of the two-dimensional codes detected in the detection target region based on the size of the image reading layout are included, the controller 0201 can use the copy control information in the two-dimensional code having the oldest date and time in the date information included in the copy control information in the detected two-dimensional codes (S1019, S1020). If only one two-dimensional code is detected in the detection target region based on the size of the image reading layout, the controller 0201 can use the copy control information in the corresponding two-dimensional code (S1019, S1021).

As a result of steps S1012, and S1018-S1021, if the copy control information in the two-dimensional code to be used is determined, the controller 0201 stores the document image read by the reading unit 0202 with the output image size in the memory 0207, and then terminates the processing (S1022). The stored image is read from the memory 0207 for use in the output processing.

The foregoing description is given of the control for enabling detection of two-dimensional codes in a document in the MFP when an image of the document to which a plurality of the two-dimensional codes are added is read in a size setting differing from the document size. By this control, even if the document size and the image reading region differ from each other and a plurality of two-dimensional codes are added to the document, the detection of two-dimensional codes is achieved. In the processing in the embodiment 2, as compared, with the processing in the embodiment 1, since a region of the image reading layout is added to the two-dimensional code detection target regions, more reliable detection of the two-dimensional codes can be achieved.

Embodiment 3

Embodiment 3 according to the present invention relates to control for enabling detection of a two-dimensional code of a document when an image of the document to which the two-dimensional code is added is read in a size setting differing from the document size, and of operation of adding a two-dimensional code including updated copy control information at the time of output.

Figure 11:
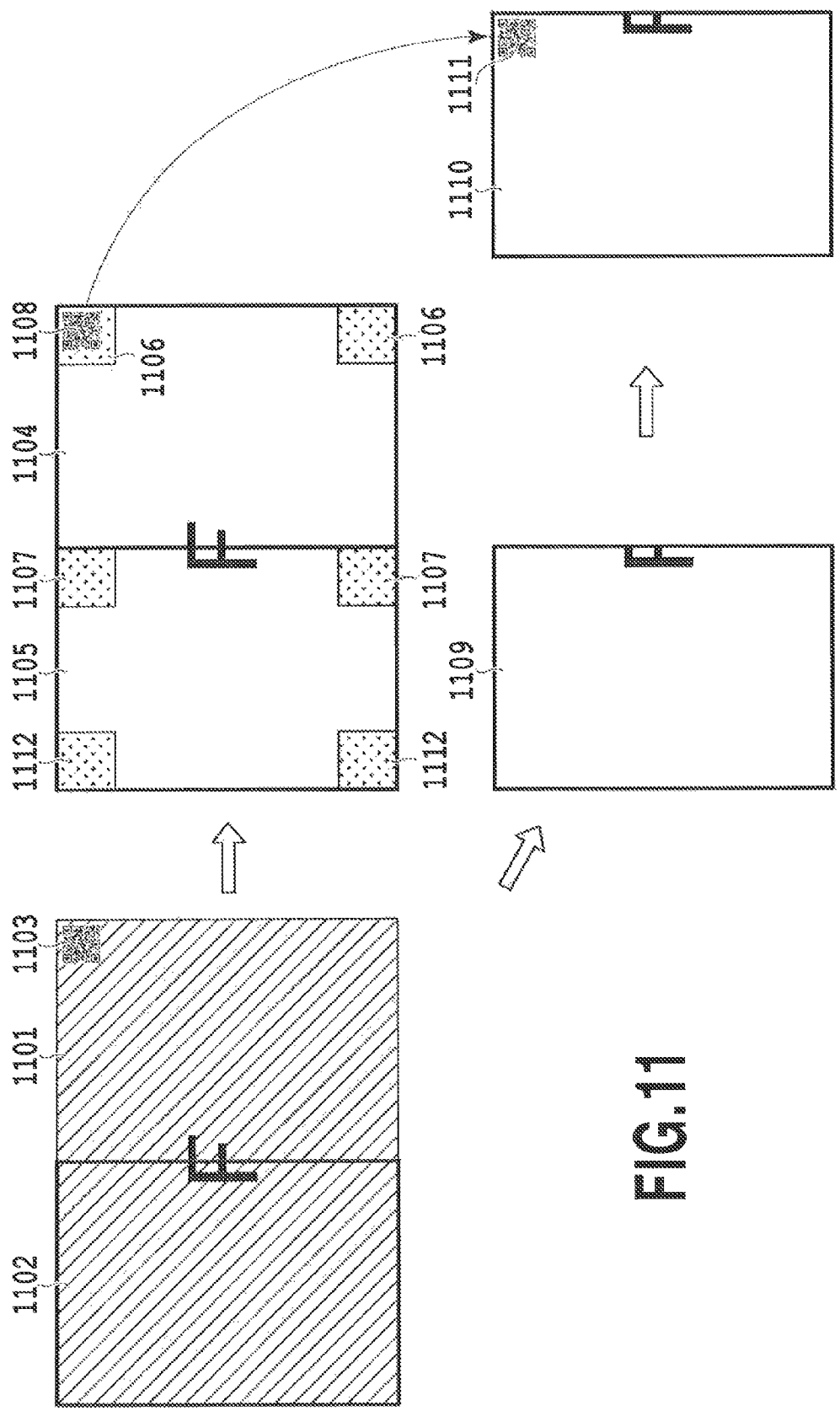
FIG. 11 is a diagram illustrating an example of a detection target region of a two-dimensional code detection and a two-dimensional code synthesized position at the time of output when an A3-size document is copied using an A4-size image reading region in embodiment 3.

Initially, differences in operation from the embodiment 2 are described with reference to FIG. 11. FIG. 11 is a diagram of copying an A3-size document. The document 1101 (shown by oblique lines) is of an A3 size, in which a two-dimensional code 1103 is added to an upper right corner of the document.

In this situation, an A4 size is specified as a paper size by user input. In this case, since the copy processing with an A4 size is performed, the image reading layout determined by the controller 0201 is of an A4 size. In the example in FIG. 11, the image reading layout is determined such that, with respect to the region of the document 1101, the region 1102 of the image reading layout is located in the left of the document region. The image reading region read by the reading-unit 0202 is identical with the region of the image reading layout.

In this case, the two-dimensional code detection target region can be defined as both of the regions, which are the A3-size region 1104 using the document sensed size obtained from the reading unit 0202 and the A4-size region 1105 using the image reading layout. As a result, the two-dimensional code detection processing is performed on the four corners (1106, 1112) of the A3-size region 1104, and the four corners (1107,1112) of the A4-size region 1105, so that detection of the two-dimensional codes 1103 (1108) added to the document can be achieved. On the other hand, the read image used in copying corresponds to the image of the region of the image reading layout, which is an A4-size region 1109.

The read image used for copying (region 1109) is an image of having read the region 1102 on the left of the document 1101. A region to which the two-dimensional code 1103 existing in the document is added is not read as an image used for copying. For copying an image to which a two-dimensional code is added, an operation is performed in order for a two-dimensional code which includes an updated version of the copy control information embedded in the two-dimensional code added to the document to be added to an image to be output. At this stage, a position where a two-dimensional code is added to the output image is a position of the output image 1110 corresponding to the detection position of the two-dimensional code 1108 detected from the two-dimensional code detection target region. Specifically, in the example in FIG. 11, since the two-dimensional code 1108 detected from the two-dimensional code detection target region is situated in the upper right corner, an updated two-dimensional code 1111 is added to the upper right position of the output image.

Figure 12:
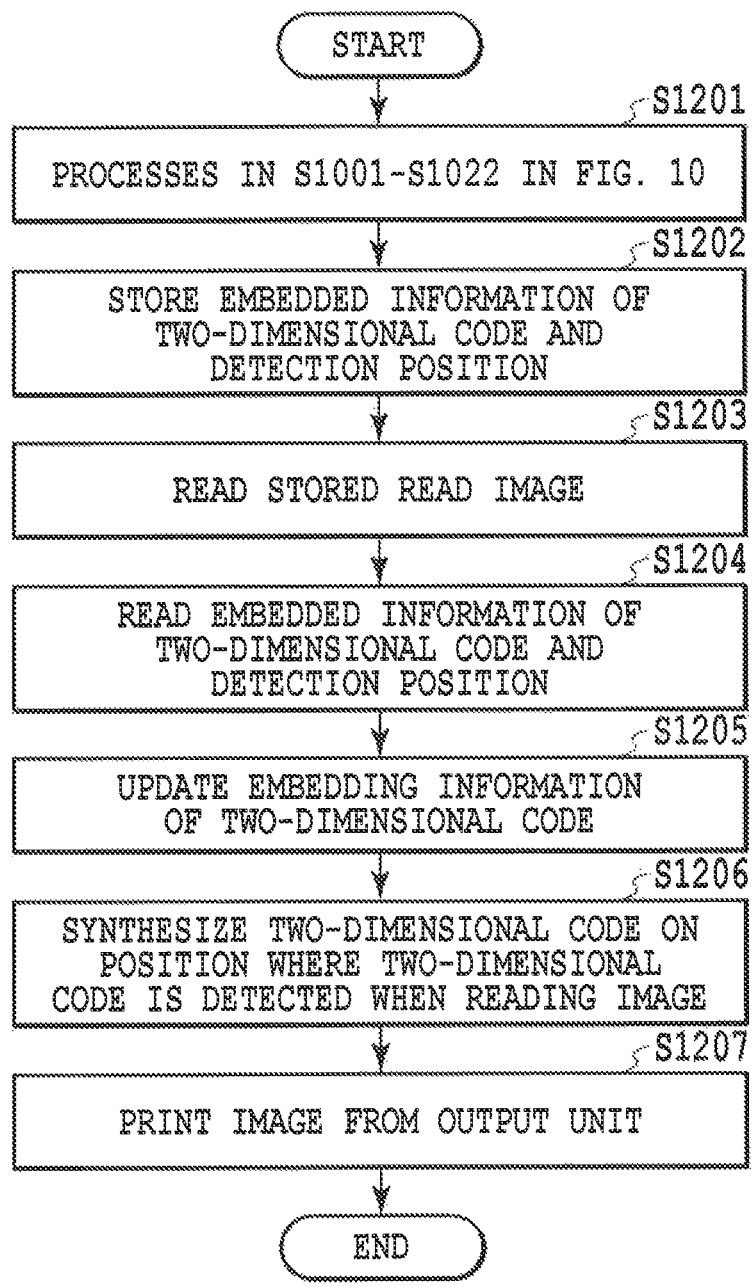
FIG. 12 is a flowchart showing processing to detect a two-dimensional code executed by the MFP in the embodiment 3.

Next, control for an operation for detecting a two-dimensional code in the embodiment 3 will be described in detail with reference to FIG. 12. FIG. 12 is a flowchart showing the control flow of an operation of the MFP to copy a document to which a two-dimensional code is added in the embodiment. In the control, the processes in steps S1202-S1207 are added to the flowchart in FIGS. 10A and 10B. Now, changes from the embodiment 2 are described.

In step S1201, in the processes from step S1001 to step S1022 in FIGS. 10A and 10B (including the processing in FIG. 7), the document is read and a two-dimensional code added to the document is detected as described in the embodiment 2.

Upon detection of a two-dimensional code, the controller 0201 stores the copy control information (embedded information) obtained from the detected two-dimensional code, and information on a position where the two-dimensional code is detected in the memory 0207 (S1202). In short, processing for acquiring position information of the two-dimensional code and processing for acquiring embedded information are performed.

Then, the MFP performs the output processing in the copy operation. First, the controller 0201 reads out the read image stored in the memory 0207 in steps S1017, S1022, into the output unit 0208 (S1203). Similarly, the controller 0201 reads the copy control information (embedded information) of the two-dimensional code and the detection position information of the two-dimensional code, from the memory 0207 (S1204). The controller 0201 updates tracking information on date and time when a copy is made, equipment identifying symbols and the like which are included in the copy control information of the two-dimensional code read from the memory 0207 in step S1204 (S1205). The controller 0201 synthesizes the two-dimensional code including the updated copy control information created in step S1205 on the read image read in step S1203. At this stage, the two-dimensional code is synthesized on a position corresponding to the position of the document where the two-dimensional code is detected which is read in step S1204 (S1206). The controller 0201 operates the output unit 0203 to print, and output the image with the updated two-dimensional code synthesized which is created in step S1206 (S1207).

The foregoing description is given of the control for an operation in the MFP to print a document to which a two-dimensional code is added after detecting the two-dimensional code on the document and updating the two-dimensional code when the image is read in a size setting differing from the document size. By the control, even if the document size and the image reading region differ from each other, a to-be-output copy image can be output after a two-dimensional code has been detected and then an updated two-dimensional code has been synthesized on a position of the to-be-output copy image corresponding to a position of the document image where the two-dimensional code is detected. In the processing in FIG. 12, the example of adding two-dimensional code update processing to the processing in the embodiment 2 is described. However, the two-dimensional code update processing can be added to the processing in the embodiment 1. The processing in FIG. 12 is applicable also when the document sensed size alone is set for the two-dimensional code detection target region.

Embodiment 4

Embodiment 4 according to the present invention relates to control for enabling detection of a two-dimensional code on a document when an image of a document to which the two-dimensional code is added is read in a size setting differing from the document size by a copying machine having a copy prohibition function.

Initially, differences in operation from the embodiment 1 is described. The embodiment 4 describes control for detecting a two-dimensional code on a document when an image is read in the operation for storing images in the copying machine or transmitting images to a personal computer or the like. For this reason, the operation in the embodiment 4 differs from the copy operation in the embodiment 1. A determination of the controller 0201 about a range of an image read from the document at the reading unit 0202 is made from the document sensed size retrieved from the reading unit 0202, and information on a size of the read document (also called "reading size") and a scaling factor which are input through the operation unit 0205 by the user.

Next, differences in the method of determining the image reading layout and the output image size from the embodiment 1 will be described. The output image size in the embodiment 4 is a size of an image used for image storage in the copying machine or image transmission to a personal compute or the like. If the user inputs a reading size used in image storing or image transmission through the operation unit 0205, an output image size is determined from the user-specified reading size and a setting of a scaling factor. In this case, a smallest paper size (standard size) available for printing an image which is generated by zooming in or out the image of the reading size by the set scaling factor is defined as an output image size. If the reading size is not specified by the user, the output image size is determined from the document sensed size and the setting of the scaling factor. In this case, a smallest paper size (standard size) available for printing an image which is generated by zooming in or out the image of the document sensed size by the set scaling factor is defined as an output image size. The image reading layout is determined such that the size of the image processed by zooming in or out the image read by the reading unit 0202 by the set scaling factor becomes equal to the output image size. For example, when the output image size is A4 and a scaling factor is 1:1 (100%), the reading image layout also results in A4. When the output image size is A4R and the scaling factor is set at 70%, the reading image layout results in A3, so that the A3-size document is scaled down to fit on the A4R size and is then image-stored or transmitted.

Figure 13:
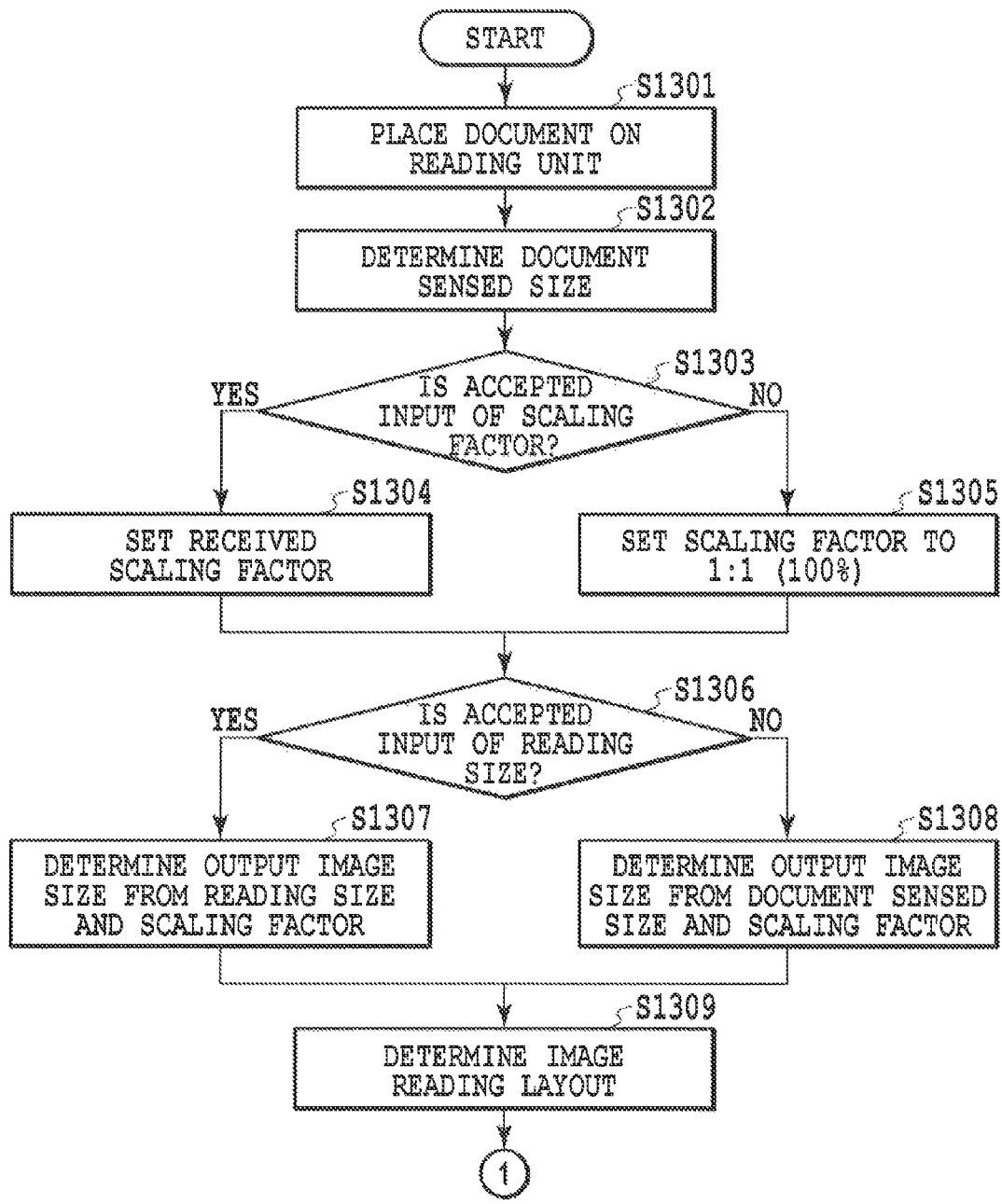
FIG. 13 is a flowchart showing processing to detect a two-dimensional code executed by the MFP in embodiment 4.

Next, control for an operation for detecting a two-dimensional code in the embodiment 4 will be described in detail with reference to FIG. 13. FIG. 13 is a flow chart showing the control flow of an operation for storing/transmitting the document with the two-dimensional code which is performed by the MFP in the embodiment. In the control, the processes in steps S1306-S1303 are changed as compared with those in the flowchart in FIG. 7. Now, changes from the embodiment 1 are described.

The operation unit 0205 accepts the input of a reading size from the user (S1306). If the reading size is input from the user, the operation unit 0205 transmits the received reading size to the controller 0201. The controller 0201 determines, to be an output image size, a smallest paper size (standard size) available for printing an image which is generated by zooming in or out the image of the received reading size by the set scaling factor (S1307) if the reading size is not input from the user, the controller 0201 determines, to be the output image size, a smallest paper size (standard size) available for printing an image produced by scaling the image of the document sensed size by the set scaling factor (S1308). The controller 0201 determines an image reading layout, which is a reading range of an image used in copying, from the scaling factor set in steps S1303-S1305 and the output image size set in steps S1306-S1308 (S1303). The operation unit 0205 determines the image reading layout such, that an image size of the image produced by scaling the read image by the set scaling factor is to be in agreement with the output image size. The following processes are the same as those in FIG. 8. In the case of the embodiment 4, if the detected two-dimensional code represents copy prohibition information, the image storing/transmitting operation for the corresponding page is cancelled.

The foregoing description is the control for detection of a two-dimensional code in the image reading process when the document size and the image reading region differ from each other in the MFP. By the control, even when the document size and the image reading region differ from each other, the detection of a two-dimensional code added to a document can be achieved.

In each of the aforementioned embodiments, after the document sensed size has been determined, the processing for receiving inputs of a scaling factor and a paper size or reading-size from the user is performed. However, after inputs of the scaling factor and the paper size or reading size have been received from the user, the processing for determining a document sensed size may be performed. The inputs of the scaling factor and the paper size or reading size from the user may be produced in any order.

If the document sensed size is obtained after the user input values input by the user can be ignored. This is because a size detected by the apparatus is trusted. Even if the user has input, for example, a size, when, after that, the apparatus senses a document size, the size sensed by the apparatus can be trusted. On the other hand, as described in each embodiment, if the size is input after the document sensed size has been determined, it may possibly express that the user has a complaint with the sensed size. Therefore, in the event, a copy can be made in a size complying with the size input.

Each of the embodiments is described, using an A3 size or A4 size as examples of paper sizes, but, as apparent to one skilled in the art, the embodiments can be applied even in use of any paper size in conformity to other standards such as American National Standards Institute (ANSI) and the like.

Other Embodiments

Aspects of the present invention can also be realized by a computer of a system or apparatus (or apparatus such as a CPU or MPU) that reads out and executes a program recorded on a memory apparatus to perform the functions of the above-described embodiments, and by a method, the steps of which are performed by a computer of a system, or apparatus by, for example, reading out and executing a program recorded on a memory apparatus to perform the functions of the above-described embodiments. For this purpose, the program is provided to the computer, for example via a network or from a recording medium of various types serving as the memory apparatus (e.g., computer-readable medium).

While the present invention has been described with reference to exemplary embodiments, it is to be understood that the invention is not limited, to the disclosed exemplary embodiments. The scope of the following claims is to be accorded the broadest interpretation so as to encompass all such modifications and equivalent structures and functions.

This application claims the benefit of Japanese Patent Application No. 2011-050520, filed Mar. 8, 2011, which is hereby incorporated by reference herein in its entirety.

What is claimed is:

1. An apparatus, comprising:
a first setting unit configured to detect a document size and set the detected document size;
a second setting unit configured to set a document size based on a specification from a user;
a reading unit configured to read an image of a region encompassing both the set document sizes on a document table to obtain a read image if the set document sizes differ from each other;
a detection unit configured to detect a two-dimensional code from a region within the read image according to the document size set by the first setting unit; and
an output unit configured to output the read image according to the document size set by the second setting unit,
wherein if the two-dimensional code representing output prohibition is detected by the detection unit, the output from the output unit is inhibited.

2. The apparatus according to claim 1, wherein the detection unit further detects a two-dimensional code from a region within the read image according to the document size set by the second setting unit.

3. The apparatus according to claim 2, wherein, if the detection unit detects a plurality of two-dimensional codes, processing is performed in accordance with the two-dimensional code detected from the region within the read image according to the document size set by the first setting unit.

4. An apparatus comprising:
a first setting unit configured to detect a document size and set the detected document size;
a second setting unit configured to set a document size based on a specification from a user; and
a reading unit configured to read an image on a document table to obtain a read image,
wherein, if the first setting unit performs the setting after the second setting unit has performed the setting, the apparatus further comprises:
a detection unit configured to detect a two-dimensional code from corner regions within the image read according to the document size set by the first setting unit; and
an output unit configured to output the read image according to the document size set by the first setting unit,
wherein, if the two-dimensional code representing output prohibition is detected by the detection unit, the output from the output unit is inhibited.

5. The apparatus according to claim 4, wherein the detection unit is configured to detect a two-dimensional code from corner regions but not to detect a two-dimensional code from regions other than the corner regions.

6. The apparatus according to claim 4, wherein the specification from the user includes specifications of a scaling factor and a size of a sheet to be used by the output unit.

7. An apparatus comprising:
a first setting unit configured to detect a document size and set the detected document size;
a second setting unit configured to set a document size based on a specification from a user;
a reading unit configured to read an image on a document table to obtain a read image;
a detection unit configured to detect a two-dimensional code from a region within the read image according to the document size set by the first setting unit;

a position information obtaining unit configured to obtain position information of the two-dimensional code detected by the detection unit;

an update unit configured to update information included in the detected two-dimensional code;

a synthesizing unit configured to synthesize a two-dimensional code including the updated information on a position of the read image which is based on the obtained position information; and an output unit configured to output the read image obtained by the synthesizing according to the document size set by the second setting unit, wherein, if the two-dimensional code representing output prohibition is detected by the detection unit, the output from the output unit is inhibited.

* * * * *